(12) United States Patent
Takashima et al.

(10) Patent No.: US 8,374,068 B2
(45) Date of Patent: Feb. 12, 2013

(54) FOCUSING AND IMAGING COMPATIBLE OBJECTIVE LENSES FOR PIXEL-BASED AND/OR BIT-BASED OPTICAL DATA RECORDING AND RETRIEVAL

(75) Inventors: Yuzuru Takashima, Cupertino, CA (US); Lambertus Hesselink, Atherton, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 679 days.

(21) Appl. No.: 12/380,577

(22) Filed: Feb. 27, 2009

(65) Prior Publication Data

US 2009/0225644 A1    Sep. 10, 2009

Related U.S. Application Data

(60) Provisional application No. 61/067,739, filed on Feb. 29, 2008.

(51) Int. Cl.
*G11B 7/00* (2006.01)
(52) U.S. Cl. .................... 369/112.24; 359/663
(58) Field of Classification Search .............. 369/103, 369/112.24; 359/663
See application file for complete search history.

(56) References Cited

U.S. PATENT DOCUMENTS

| | | | |
|---|---|---|---|
| 6,108,110 A | 8/2000 | Orlov et al. | |
| 6,310,850 B1 | 10/2001 | Sochava et al. | |
| 6,512,606 B1 | 1/2003 | Lipson et al. | |
| 7,342,865 B2 | 3/2008 | Kubo | |
| 7,606,133 B2 * | 10/2009 | Fukumoto et al. | 369/103 |
| 7,623,279 B1 * | 11/2009 | Ayres | 359/22 |
| 2004/0156083 A1 * | 8/2004 | Sugiki et al. | 359/3 |
| 2005/0036182 A1 | 2/2005 | Curtis et al. | |
| 2006/0238841 A1 * | 10/2006 | Anderson et al. | 359/10 |
| 2006/0256416 A1 * | 11/2006 | Zeng et al. | 359/29 |
| 2006/0262369 A1 * | 11/2006 | Zeng et al. | 359/29 |

* cited by examiner

*Primary Examiner* — Wayne Young
*Assistant Examiner* — Brenda Bernardi
(74) *Attorney, Agent, or Firm* — Lumen Patent Firm

(57) ABSTRACT

A low cost and lightweight interchangeable lens system is provided. The lens system includes two aspheric elements that is usable both for page-based and bit-based data storage systems. The lens system has a large field of view up to ±50 degrees and a high numerical aperture up to 0.8. The invention reduces cost and weight of the objective lenses and is usable with the servoing technology. The invention provides a long working distance of 20% of the focal length and provides sufficient physical space to accommodate media and aberration corrections, which enable a media interchangeable and compatible system among the both optical recording formats.

8 Claims, 6 Drawing Sheets

(a)

(b)

(c)

(d)

(e)

(f)

FOCUSING AND IMAGING COMPATIBLE OBJECTIVE LENSES FOR PIXEL-BASED AND/OR BIT-BASED OPTICAL DATA RECORDING AND RETRIEVAL

CROSS-REFERENCE TO RELATED APPLICATIONS

This application is cross-referenced to and claims the benefit from U.S. Provisional Application 61/067,739 filed Feb. 29, 2008, and which are hereby incorporated by reference.

FIELD OF THE INVENTION

The invention relates generally optical recording. More particularly, the invention relates to a two-element aspheric objective lens for media interchangeability with optical recording systems.

BACKGROUND

Objective lenses for pixel-based optical recording consist of three or more elements per one set of a lens-set pair. Thus the lens system is heavy and costly. A low cost and lightweight objective lens system is highly desired because it enables employing servoing technologies for addressing data, which substantially reduces cost of optical data storage setup.

In general, the objective lenses are not compatible with the bit-based recording scheme such as CD, DVD and Blu-ray. Backward compatibility with such existing systems is also highly desired.

For commercial use of optical data storages, the recording medium must be interchangeable among many recording and retrieve configurations to render the data storage system usable for archive and distribution purposes. The lens systems currently found in the art do not effectively address interchangeability.

For page-based systems, optical design criteria relating to the required number of elements and allowable aberrations are not clear. Therefore minimum lens configurations of such compatible designs have not been identified.

Both page-based and bit-based recording requires high NA objective lenses. Usually, such a high NA lens for page-based system requires three or more spherical lens elements, which are not compatible with bit-based recordings.

Designs using aspheric elements having NA of 0.74 are reported, however the working distance is very small (<0.1 mm) which prevents the lens from using thick recording medium required for high-density page-based recordings. To date media interchangeability has not been considered. Specifically, these systems are not compatible with bit-based recordings because aberration correction requirements are not completely satisfied. The small working distance prevents the design from being used with thick recording material for high-density recording applications.

Designs having a moderate NA of 0.5 using one, two and three elements have been reported, however media interchangeability is not a consideration. Specifically, addition to moderate NA, compatibility with bit-based recordings is not taken into account.

The objective lens for page-based optical data recording and retrieval generally consists of many lens elements (usually three or more) to accommodate high NA (equivalently a large field of view), thus the objective lens is costly and heavy.

What is needed is a low-cost and light weight lens design of a high NA objective lens with a reduced number of elements for optical data storage and retrieval for page-based systems having a capacity for interchangeable medium, for example that are also usable for bit-based optical recording and retrieval like CD, DVD and Blu-ray systems, where aberration correction is considered. What is also needed is an medium-interchangeable lens system that allows for a sufficient working distance to accommodate thick recording medium required for high-density recording to avoid crashing the objective lens to the media.

SUMMARY OF THE INVENTION

The present invention provides an medium-interchangeable lens system for data recording and retrieval with page-based holographic medium and bit-based optical recording medium.

According to one aspect, the lens system is telecentric.

In another aspect of the invention, the lens system includes a first pair of lens elements and a second pair of lens elements, where the lens elements have at least one aspheric surface. Here, the first pair of lens elements is symmetric to the second pair of lens elements with respect to an optical center plane of the recording medium, where the optical recording medium can include photo-sensitive recording medium and recording medium having at least one optical coating, at least one metal coating, at least one grating, and a support substrate. According to one aspect, the medium is removable from between the first pair and the second pair. In a further aspect, each lens pair is an air spaced aspheric doublet having at least 5-degrees of freedom, where the degrees of freedom can include a radii of the lens surface, a thickness of the lens, an air spacing between two the lenses, an index of refraction of the lens, and at least one conic aspheric constant of the lens. Further, each the lens pair has a numerical aperture in a range of 0.3 to 0.86. According to one aspect, a second lens element in the lens pair is disposed proximal to the recording medium, where the second lens element includes a meniscus lens element having a positive-power surface and a negative-power surface and the negative-power surface is disposed to face the medium, where a first lens in the lens element pair is disposed distal to the recording medium and the first lens element includes a positive lens element having a first surface and a second surface, where the second surface can be a negative-power surface, a planar surface or a weak positive power surface, where the first surface comprises a positive-power surface, and the second surface is disposed proximal to the recording medium.

According to a further aspect of the invention, the lens system satisfies an offense against sine condition, where the offence against sine condition is a value less than $(0.1 \times \text{pixel size})/(\sqrt{2} \text{ NA})$.

According to another aspect of the invention, a geometrical spot diameter in root mean square ($D_{rms}$) formed by a light source passing through the lens system satisfies a condition $D_{rms} \approx 0.001$ mm, where the light source can include an object beam, a recording reference beam or a reconstruction reference beam.

In yet another aspect, the lens system has a wavefront aberration in root mean square (rms) of an object imaging configuration ($\sigma_{image}$) in rms of $\sigma_{image} < 0.025/f$, where f is a focal length of the lens pair for a scaled system, and the scaled system is scaled by a factor of f.

According to a further aspect of the invention, the lens system has a wavefront aberration of a pupil imaging configuration ($\sigma_{pupil}$) in rms of $\sigma_{pupil} < 0.05/f$, where f is a focal length of the lens pair for a scaled system and the scaled system is scaled by a factor of f.

According to another aspect, a light source used in the data recording and retrieval has a wavelength in the range of 392-850 nm.

In a further aspect, the lens system can be used with a transmission spatial light modulator (SLM) or a reflective SLM.

According to another aspect of the lens system used for page-based recordings, only one of the pairs of the lens system is necessary for certain page-based recording implementations. An example of such an implementation includes, but is not limited to, a system employing a recording medium having a reflecting surface and a phase conjugate readout which employs a phase conjugate readout reference beam. For bit-based recordings like CD, CD-R, CR-RW, CD+RW, DVD-RAM, DVD-ROM, DVD-R, DVD+R, DVD-RW, DVD+RW, BluRay and BD-R, only one of the pairs of the lens system is necessary. For bit-based recording using micro-holographic gratings inside a medium as a representation of bits, either the two lens-pair configuration or a one lens-pair configuration is possible. Micro-holographic recordings using two lens-pair configuration employ laser beams delivered through and focused by both of the pairs. At the co-located focal points of the lens pairs, a micro hologram is formed as a result of interference between such counter propagating laser beams. Micro-holographic recordings using only one lens-pair incorporate auxiliary optical systems which produce a laser beam propagating in the opposite direction with respect to the laser beam delivered by the said lens-pair. An example of such an auxiliary optical system includes, but is not limited to, an optical system including mirrors, combination of lens(es) and mirrors as well as phase conjugate mirrors.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
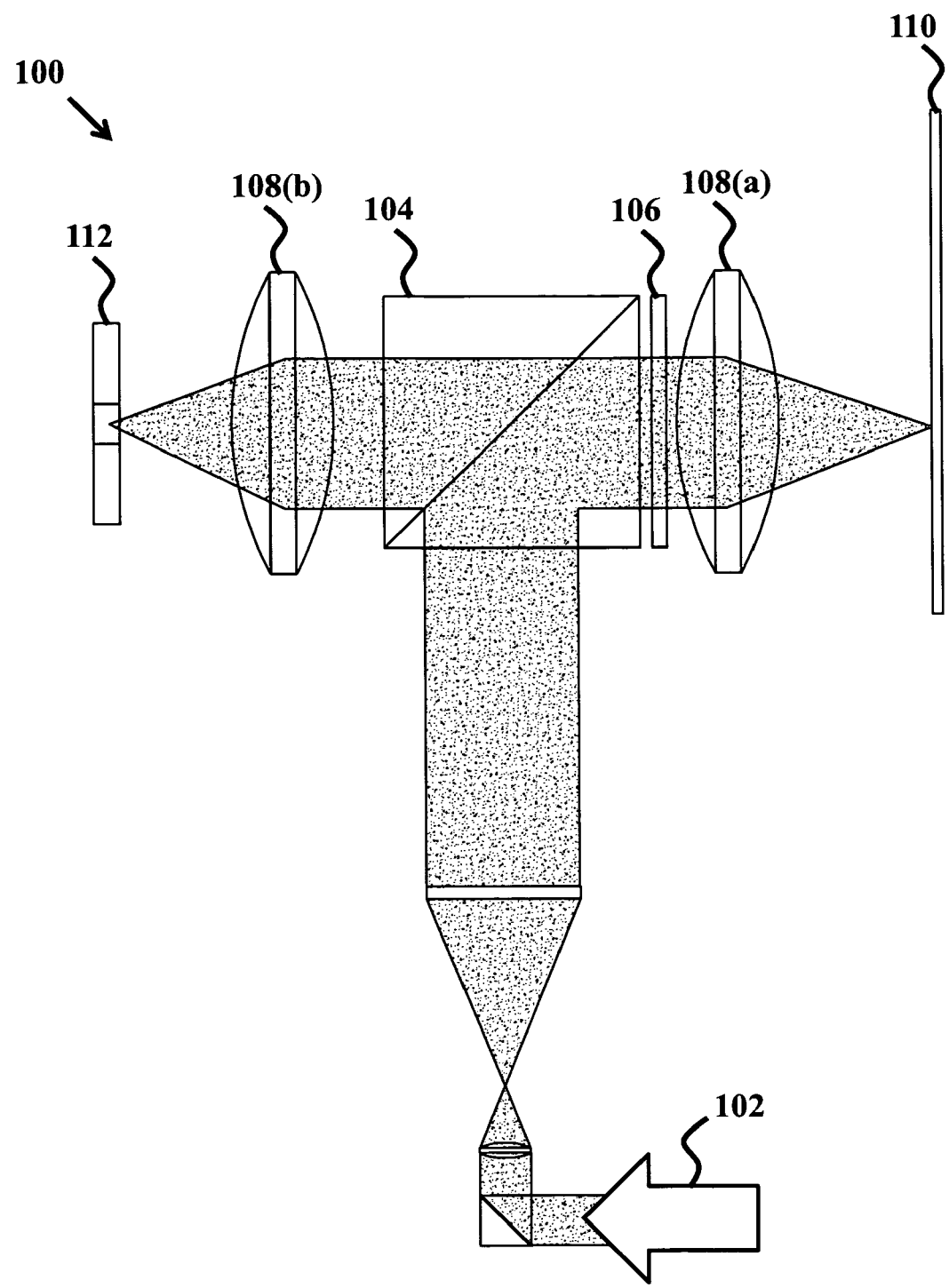
FIG. 1 shows a planar view of schematic of a bit-based recording system having a lens system according to the current invention.
Figure 2:
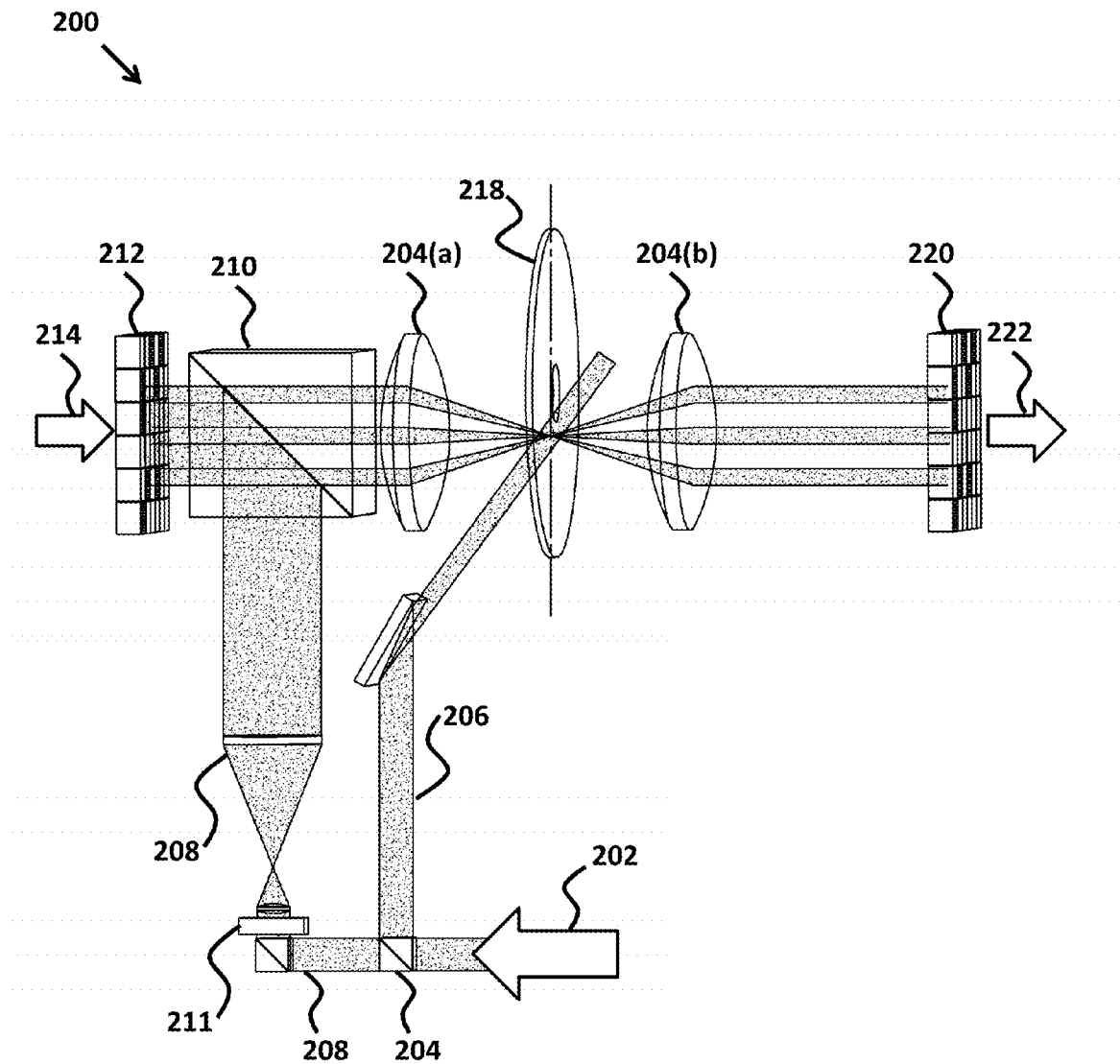
FIG. 2 shows a perspective view of a schematic of a holographic recording system having a lens system according to the current invention.
Figure 3:
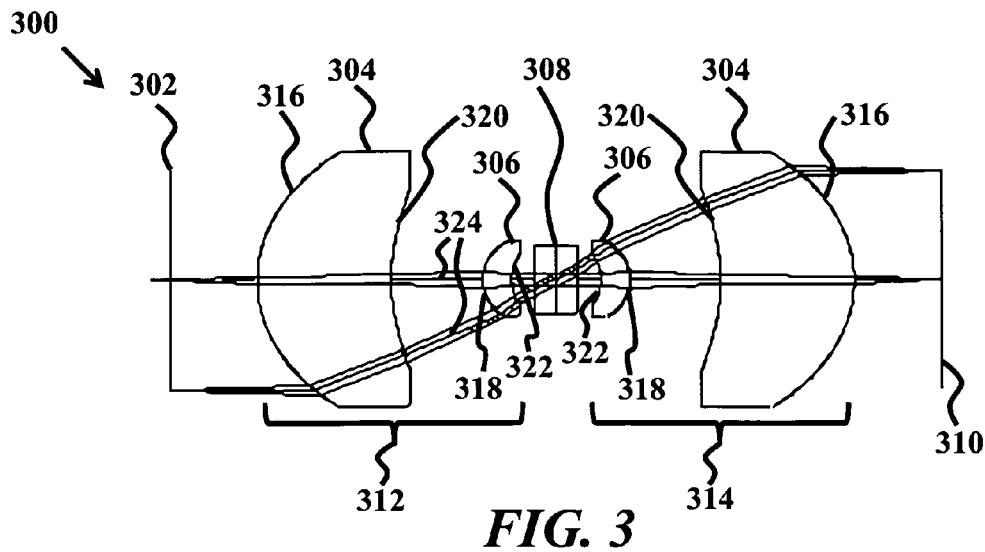
FIG. 3 shows a planar schematic view of an interchangeable lens system for data recording and retrieval with page-based holographic medium and bit-based optical recording medium, according to the current invention.

The invention provides lens systems having interchangeable media, which are usable both for bit-based optical recordings such as CD and DVD and page-based holographic recording. FIG. 1 and FIG. 2 show bit-based optical recording system and page-based holographic recording system, each using the lens system according to the current invention, where the objective lenses are schematically shown. A detailed showing of the objective lenses is shown in FIG. 3, according to one embodiment of the invention.

It is strongly desired that the page-based systems are compatible with bit-based recording systems to assure compatibility. FIG. 1 shows a schematic of the bit-based read and write (RW) recording system 100, using a lens system according to the current invention. The bit-based recording system 100 includes a light source (not shown) providing a laser beam 102 disposed to enter a polarized beam splitter 104, and is directed through a quarter wave plate 106, through a first objective lens 108(a), which focuses the laser light 102 inside the media 110. Inside the media 110, the focused laser beam 102 modulates reflectively of the recording layer (not shown), which includes phase change materials such as Germanium-Antimony-Tellurium (GST). The local temperature increase imposed by the focused laser beam 102 changes the phase of the recording material from amorphous to crystalline. Thus, data is recorded as a local difference of material phase, amorphous versus crystalline, or equivalently as a local difference of reflectivity of materials attributed to difference of material phase. Upon readout, the difference in reflectivity is read out by the same optical setup, but with much smaller laser power (not shown) to avoid destroying the recorded data. The low-power laser light is reflected from the media 110 then passes through the quarter wave plate 106 and directly through the polarized beam splitter 104, where it is focused by a second lens 108(b) onto a detector 112. Depending on the form by which data is implemented, other recording schemes such as read only memory (ROM) and write once memory (R) can be used with the lenses 108 of the current invention. Moreover, micro holographic data storages, which use small gratings inside the media as bits, are also within the scope of the invention in addition to the phase change, ROM and -R memories. Thus, recording and reconstruction processes are employing focusing inside and on the surface of the media 110.

The lens system of the current invention used in holographic recording is shown in FIG. 2, where shown is a schematic of a holographic recording system 200. The holographic recording system 200 includes a light source (not shown) providing a laser beam 202 disposed to enter a beam splitter 204, which divides the beam into a reference beam 206 and an object beam 208. It is understood that FIG. 2 is an exemplary holographic recording system, where the reference beam 206 may be configured to pass through the lens system. Also, the reference beam 206 may be configured to be delivered to the medium 218 from the side of the medium 218, which is opposite to the side of the medium 218 to which the object beam 208 is delivered. The object beam 208 is controlled by a shutter 210 to pass the object beam 208 onto a beam splitter 210. The beam splitter 210 can be a polarized one by incorporating wave plates (not shown) inserted between the beam splitter 210 and spatial light modulator 212. Upon recording, digital data of the object beam 208 is expressed as a two-dimensional binary bit pattern on a spatial light modulator (SLM) 212 that receives a 2D page data input 214. The bit pattern from the SLM 212 is Fourier transformed by the first lens 204(a) and recorded as a Fourier volume hologram by interference with a recording reference beam 206 within a photo-sensitive medium 218. For reconstruction, the stored hologram is illuminated by a reference beam, for example beam 206 for reconstruction. The reconstructed beam 216 from the hologram is inversely Fourier transformed by a second objective lens 204(b) and imaged onto the two-dimensional detector array 220, which has 2D page data output 222. Thus, the recording and reconstruction employs imaging between the SLM 212 and photo detector array 220 in a time-delayed manner. In addition to the example described above, by employing recording media 218 having a reflecting surface or by employing phase conjugate readout, the lens system 204(a) takes a role of the lens system 204(b). For such implementations, the spatial light modulator 212 and detector array 220 are located optically on the same side of the disc and the lens 204(b) is not required. Such implementations can be understood as follows. The optical system having two lens systems is folded with respect to the optical center, for example due to a reflecting surface in the medium. Therefore, such one lens-system implementations are also within the scope of the invention since these two implementations are optically equivalent through folding and unfolding relationships.

Until now, the lens system for imaging between the SLM 212 and photo detector array 220 did not focus the laser beam 102 well inside the media 110, and vice versa. This is because that aberration correction for the imaging did not assure good aberration correction for focusing. The current invention is a lens systems that performs good imaging and focusing simultaneously, which is strongly desired especially for page-based holographic recording systems in consumer use because the lens makes the system backward compatible with preexisting optical recording schemes. Furthermore, the small and lightweight design of the current invention is strongly desired for such compatible systems because it enables the implementation of high bandwidth focusing and tracking servo systems, which is essential to increase data transfer rate by high rotation speeds of the disk. According to one aspect of the invention, a light source used in the data recording and retrieval has a wavelength in the range of 392-850 nm.

In the embodiments described herein, an element is a single lens, a system is one or more lens elements, and a pair is part of the system that includes identical subsystems, which are symmetric with respect to the optical center plane.

FIG. 3 shows an medium-interchangeable lens system 300 for data recording and retrieval with page-based holographic medium and bit-based optical recording medium, according to the current invention. The lens system 300 includes four aspheric elements and is symmetric with respect to the center of the recording media. As shown in FIG. 3, from the left to right, the system includes an object plane 302, a first lens element 304, a second lens element 306, recording media 308, a third lens element 306, a fourth lens element 304 and an image plane 310, where the first and fourth lens elements 304 and the second and third lens elements 306 are identical except for their respective orientations as well as a scaling factor for some instances. On the object plane 302, a SLM is placed (not shown). Alternatively, the image of the transparent SLM (or reflective SLM) formed by relay optics (now shown) is placed. In FIG. 3, the first lens element 304 and second lens element 306 form a first a lens combination 312, and the third lens element 306 and fourth lens element 304 form a second a lens combination 314.

The lens element 304 and lens element 306 are meniscus elements, which have positive power first surfaces 316 and 318, respectively and negative power second surfaces 320 and 322, respectively, where the negative power surface (320/322) is located at the side towards the media 308. Alternatively, the lens element 304 can be a planar-convex or a weak convex-convex element, with the planar or weak convex surface facing the media 308. The chief-ray 324 is parallel to the optical axis both at the object plane 320 and image plane 310, i.e. the lens system is telecentric.

According to one aspect of the invention, the first pair of lens elements (304/306) is symmetric to the second pair of lens elements (306/304) with respect to an optical center plane of the recording medium 308, where the optical recording medium 308 can include photo-sensitive recording medium and recording medium having at least one optical coating, at least one metal coating, at least one grating, and a support substrate, where the medium 308 may be removable from between the first pair (304/306) and the second pair (306/304).

Figure 4:
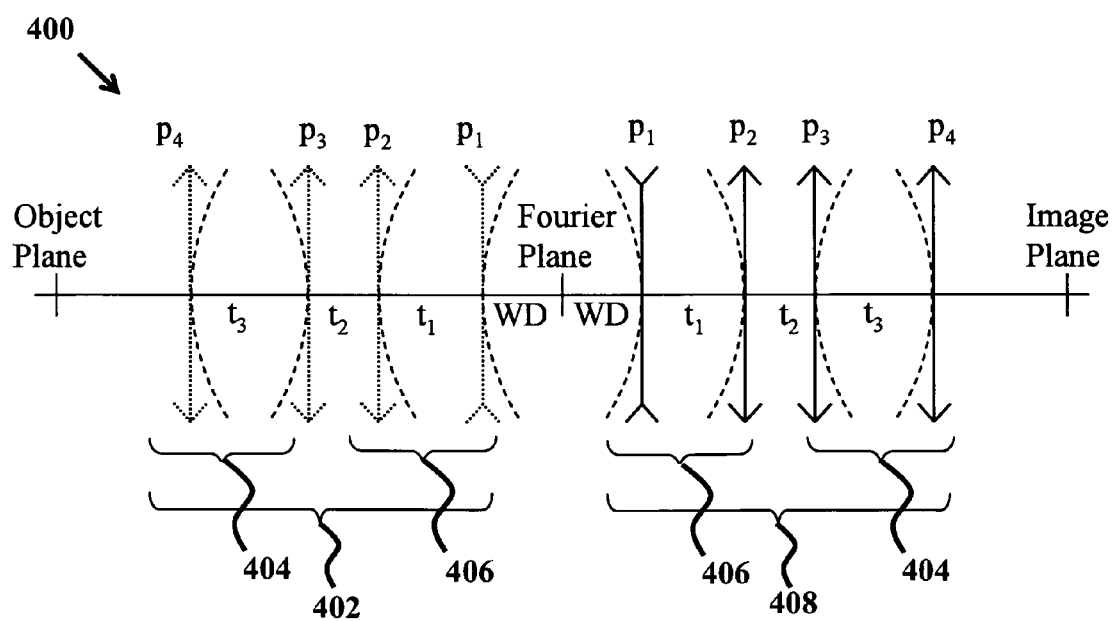
FIG. 4 shows a generalize lens system 400 of the current invention.

A generalize lens system 400 of the current invention is shown in FIG. 4. A first lens pair 402 on the left-hand part of the system 400 includes lens element 404 and lens element 406. The lens element 404 of the first lens pair 402 is specified by power of surfaces (p4 and p3, defined by (N'-N)/R, where N' and N are index of refraction of material to the right and to the left of the surfaced which radius is R and reduced thickness t3 of the lens element 404, which is defined by physical thickness of the lens element 404 divided by the index of refraction of the lens material. For the element 406, p2, p1 and t1 are defined accordingly. The number of degree of freedom is seven for a given index of refraction (four powers, p1, p2, p3, p4 and three reduced thickness t1, t2, t3) due to the symmetric arrangement of the system.

The reduced thickness of WD from the second surface of the lens element 406 to the center of the medium (Fourier plane) is called as a working distance. Five or more degrees of freedom are required for the bit-page-compatible and media interchangeable embodiments according to the current invention. By making one or more surfaces aspheric surfaces, the configuration has sufficient degrees of freedom, equal to or larger than five, for a given focal length, working distance, and Petzval curvature which value is know to be limited within relatively narrow ranges for good image quality.

The power of Lens 402, defined by the inverse of the focal length, of the left half of the system includes lens element 404 and lens element 406 is normalized to unity to specify optical designs of the invention. Note that the power is not necessarily unity but takes arbitral value by scaling the entire system as far as aberration criteria (discussed below) are satisfied.

In one aspect of the invention, each lens pair is an air spaced aspheric doublet having at least 5-degrees of freedom, where the degrees of freedom can include a radii of the lens surface, a thickness of the lens, an air spacing between two the lenses, an index of refraction of the lens, and at least one conic aspheric constant of the lens. Further, each the lens pair has a numerical aperture in a range of 03 to 0.86. According to one aspect (see FIG. 3), the second lens element 306 in the lens pair (312/314) is disposed proximal to the recording medium, where the second lens element 306 is a meniscus lens element having a positive-power 318 surface and a negative-power surface 322 and the negative-power surface 322 is disposed to face the medium 308, where a first lens 304 in the lens pair (312/314) is distal to the recording medium 308 and the first lens element 304 includes a positive lens element having a first surface 316 and a second surface 320, where the second surface 320 can be a negative-power surface, a planar surface or a weak positive power surface, where the first surface 316 comprises a positive-power surface, and the first surface 316 is disposed to distal the recording medium 308.

The lens having both good imaging and focusing performance generally satisfies the following conditions under the condition of total power is unity.

1) Power of the lens element 404: $p_{II}=p_3+p_4-t_3p_3p_4$
   $0.4<p_{II}<0.6$
-2) Power of the surface of the lens element 404: p3
   $1.5<p_3<0$
3) Reduced thickness of the lens element 404: t3
   $2.5<t_3<4$
4) Index of refraction of the lens element 406 and lens element 404:N1, N2
   $N_1, N_2>1.59$
5) Petzval sum PTZ
   $0.2<PTZ<0.4$
6) Working Distance
   $WD>0.2 f$ Also, according to the current invention, the following optical design tolerances include:
1) Offence against the Sine Condition: OSC
   $OSC<\Delta h/(\sqrt{2} NA)$
   Where, $\Delta h$ is the pixel shift tolerance having a unit of length and $NA=\sin(\theta)=h_1/f_1$, $h_1$ is the object height for imaging and $f_1$ is the focal length of the lens 402. The system 400 needs to satisfy the tolerance to make the holographic system media interchangeable.
   According to one aspect of the invention, the lens system satisfies an offense against sine condition, where the offence against sine condition is a value less than $(0.1\times pixel\ size)/(\sqrt{2} NA)$.
2) The geometrical spot diameter in rms of object, recording reference and reconstructing reference beams.: $D_{rms}$ $D_{rms}$ is a geometrical spot diameter evaluated at the distance $f_{ideal}$ from the Fourier plane, $f_{ideal}$ is a focal length of an ideal lens inserted at the Fourier plane to evaluate $D_{rms}$.

$$D_{rms} < \frac{\sqrt{0.8}}{\frac{\pi d}{\lambda_0} \frac{\sin\phi_R\sqrt{n^2-\sin^2\phi_O}-\sin\phi_O\sqrt{n^2-\sin^2\phi_R}}{\sqrt{n^2-\sin^2\phi_R}} \sqrt{\frac{1}{48 f_{ideal}^2}\left\{\frac{\cos^4\phi_O}{n^2-\sin^2\phi_O}+5\frac{\cos^4\phi_R}{n^2-\sin^2\phi_R}\right\}}}$$

$$\approx 0.001 \text{ mm}$$

where, d is a thickness of the recording medium, $\lambda_0$ is a wavelength of the laser source, n is the index of refraction of the recording material $f_{ideal}$ is a focal length of the ideal focusing lens placed at the Fourier plane $\phi_R$ and $\phi_O$ are the maximum incident angle of reference beam and object beam measured from the optical axis in air, respectively.

$D_{rms}$, is the geometrical spot diameter in rms, of object, recording reference and reconstructing reference beams. Note that, to evaluate $D_{rms}$, an ideal lens is inserted having a focal length of $f_{ideal}$ and evaluate $D_{rms}$ on the plane at the distance $f_{ideal}$ from the Fourier plane. Only the Lens 402 is used to evaluate $D_{rms}$. The system needs to satisfy the tolerance to make the holographic system media interchangeable having an acceptable drop of signal, 20% of theoretical value.

According to another aspect of the invention, a geometrical spot diameter in root mean square ($D_{rms}$) formed by a light source passing through the lens system satisfies a condition $D_{rms}\approx 0.001$ mm, where the light source can include an object beam, a recording reference beam or a reconstruction reference beam.

3) Wavefront aberration in rms in the object imaging configuration for $p_{total}=1$, in the unit of $\lambda_0$: $\sigma_{image}$ $\sigma_{image}<0.025/f$, where f is the focal length of the Lens 402 and Lens 408 for the scaled-up system by factor of focal length f. Note that $\sigma_{image}$ is evaluated for $1^{st}$ pair 402 and $2^{nd}$ pair 408 separately. The system needs to satisfy the tolerance to make the holographic system having small amount of signal degradation due to bluring of SLM image.

In another aspect of the invention, the lens system has a wavefront aberration in root mean square (rms) of an object imaging configuration ($\sigma_{image}$) in rms of $\sigma_{image}<0.025/f$, where f is a focal length of the lens pair for a scaled system, and the scaled system is scaled by a factor of f.

4) Wavefront aberration in rms in the pupil imaging (or focusing) configuration in the unit of $\lambda_0$: $\sigma_{pupil}$;

$\sigma_{pupil}<0.05/f$, where f is the focal length of the Lens 402 and Lens 408 for the scaled-up system by factor of f. The system needs to satisfy the tolerance to make the holographic system compatible with bit-based recording systems.

According to a further aspect of the invention, the lens system has a wavefront aberration of a pupil imaging configuration ($\sigma_{pupil}$) in rms of $\sigma_{pupil}<0.05/f$, where f is a focal length of the lens pair for a scaled system and the scaled system is scaled by a factor of f.

Power of the lens element 404: $p_{II}$, power of the surface of the element p3, reduced thickness of the lens element 404: t3, index of refraction of the lens element 406:N1 and lens element 404:N2, Petzval sum (PTZ) are all satisfying the criteria.

Wave aberration averaged over 6 fields for imaging at Fourier plane ($\sigma_{image}$) is about $0.004\lambda$, which corresponds to $\sigma_{image}=0.008\lambda$ for imaging from the SLM to sensor arrays. Wave aberration for the pupil imaging ($\sigma_{pupil}$) is about $0.008\lambda$ which is sufficiently small to implement functionalities employing focusing. OSC and $D_{rms}$ are less than 0.0012 and 0.636 μm, respectively which satisfies the tolerances discussed previously.

Three exemplary designs are provided using different glass materials such as N-BACD5N N1, N2=1.59219 HOYA, K-PSFn3 N1, N2=1.85078 Sumita and K-PSFn214 N1, N2=2.15858 for the wavelength of 532 nm.

Figure 5:
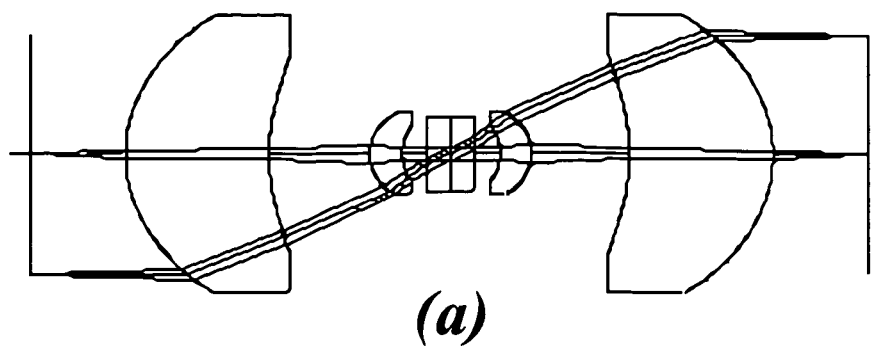
FIGS. 5(a-f) show lens drawings and field aberrations of the three exemplary lens systems according to the present invention.
Figure 5:
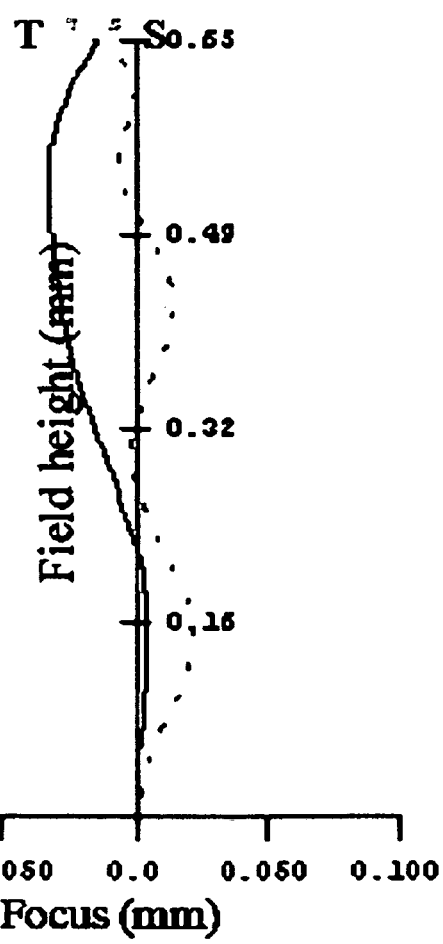
Figure 5:
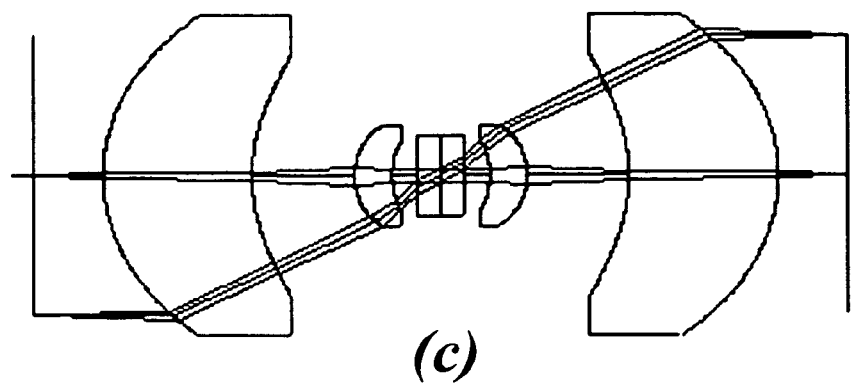
Figure 5:
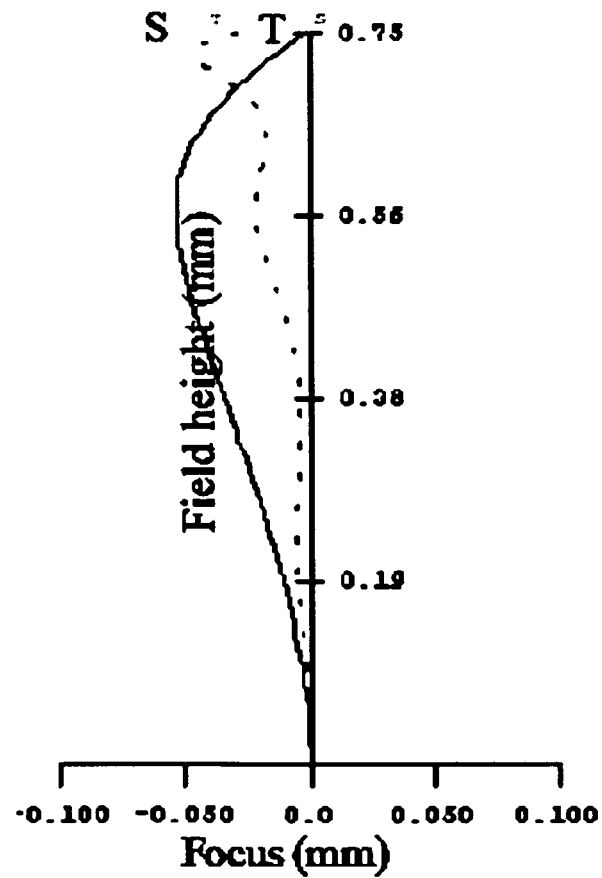
Figure 5:
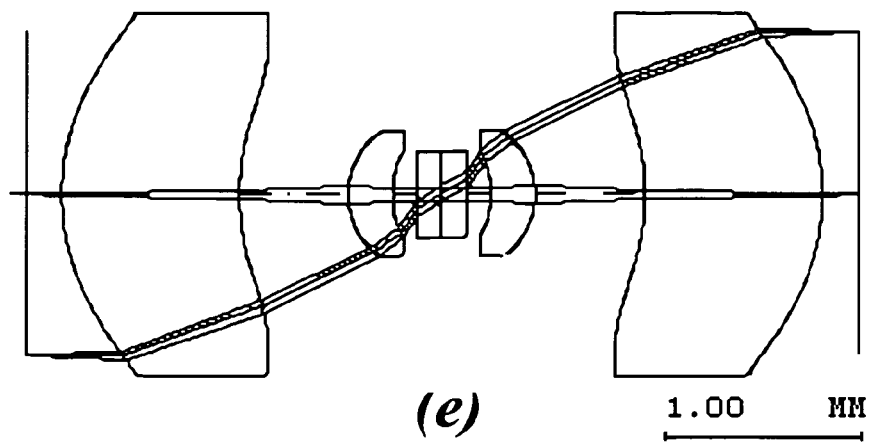
Figure 5:
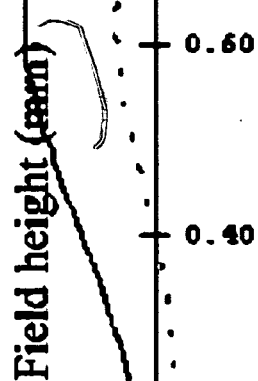

Table 1 summarizes optical design parameters and optical tolerance values of three designs. FIGS. 5(a), 5(c) and 5(e) show lens drawings for these exemplary designs, where for FIG. 5(a) N1, N2=1.59219, FIG. 5(c) N1, N2=1.85078 and FIG. 5(e) N1, N2=2.15858.

FIGS. 5(b), 5(d) and 5(f) show the field aberrations of the three designs, where for 5(b) N1, N2=1.59219, FIG. 5(d) N1, N2=1.85078 and FIG. 5(f) N1, N2=2.15858. First, high NAs of 0.8, 0.75 and 0.7 are attained for lens systems whose index or refraction of the glass materials are N1, N2=2.15858, 1.85078 and 1.59219, respectively.

TABLE 1

Design results.

| $NA_{pupil}$ | N | $p_{II}$ (mm$^{-1}$) | $p_3$ (mm$^{-1}$) | $t_3$ (mm) | PTZ | $\sigma_{pupil}$ (λ) | $\sigma_{image}$ (λ) | OSC | $D_{rms}$ (mm) |
|---|---|---|---|---|---|---|---|---|---|
| 0.7  | 1.59219 | 0.522 | −0.591 | 0.45 | 0.416 | 0.0046 | 0.0036 | 0.0011 | 0.536 |
| 0.75 | 1.85078 | 0.481 | −0.949 | 0.4  | 0.337 | 0.0079 | 0.0041 | 0.0012 | 0.621 |
| 0.8  | 2.15858 | 0.448 | −1.007 | 0.35 | 0.333 | 0.0066 | 0.0042 | 0.0012 | 0.636 |

$NA_{object} = 0.035$, $h_{pupil} = 0.01$

Note that the invention may scale-up the solutions to obtain lens systems having appropriate focal length as long as the tolerances are satisfied. Since the tolerances such as OSC and $D_{rms}$ are invariant with respect to scaling, whereas $\sigma_{image}$ and $\sigma_{pupil}$ scale linearly with scaling factor. Therefore, the scaled systems are $\sigma_{image}$ and $\sigma_{pupil}$ limited ones. For example, the scaled up system having f=5 mm and WD=1 mm has imaging aberrations (2 $\sigma_{image}$) and pupil aberration ($\sigma_{pupil}$) of 0.04λ. These are still sufficiently small level of aberrations for the system having 1.2 mm thickness and 8 mm square image field.

High NA objective lens designs in the current invention are usable for both page-based and current bit-based recordings, which makes the page-bases system media interchangeable and backward compatible with existing recording schemes such as CD, DVD, HD DVD and Blu-ray. The two-element design reduces the cost of the objective lens. Also the light-weight system, due to less number of elements, makes the objective lens usable with servoing technologies, which are inevitable for commercial use of optical data storages. The invention has sufficiently long working distance (20% of focal length), which enables the system to be used with thick recording materials required for high density page-based recordings and to be used with bit-based recordings which use medium having thick substrates.

The high NA aspect of the current invention makes the optical setup for the page-based recording simple because the object and reference beams are delivered through a single objective lens. The invention is robust to vibrations caused by surrounding environment and servoing because of the common path setup for which object and reference beams share a single optical system. The high NA design also increases recording density if the dynamic range of the recording material is not severely limited.

The two-element design enables the objective lens usable with large-bandwidth servoing technology for tracking and focusing due to the design having of only two elements.

The invention satisfies criteria for media interchangeable page-based and bit-based optical recording systems. The long working distance of 20% of the focal length and the designs satisfying the described criteria provide sufficient physical space to accommodate media and aberration corrections which realize media interchangeable and compatible system among the both recording formats of the page-based and bit-based optical recordings.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example the range of the optical design parameter, the wavelength ranges of approximately from 400 nm to 1000 nm are possible as far as the power arrangement of such systems satisfy the criteria, where the change of wavelength of light changes index of refraction of the glass material and thus, numbers for thickness, radius and aspheric constants change. The invented lens can be used both with transmission type spatial light modulator (SLM) such as liquid crystal spatial light modulator as well as reflection type SLM such as digital mirror device (DMD) with a relay lens. The invention is also usable as relay lenses required for optical setups, which have reflection type SLMs. The objective lens of the current invention can be used for the common path optical setup in which both the reference and object beams are delivered through the objective lens. The invented lens can be used for optical setups such that the reference beam is delivered by a designated optical system.

According to another aspect of the lens system used for page-based recordings, only one of the pairs of the lens system is necessary for some page-based recording implementations which include, but are not limited to, a system employing a recording medium having reflecting surface and a phase conjugate readout which employs phase conjugate readout reference beam. For bit-based recordings like CD, CD-R, CR-RW, CD+RW, DVD-RAM, DVD-ROM, DVD-R, DVD+R, DVD-RW, DVD+RW, BluRay and BD-R, only one of the pairs of the lens system is necessary. For bit-based recording using micro-holographic gratings inside the medium as bits, either the two lens-pair configuration or a one lens-pair configuration is possible by incorporating auxiliary optical systems which produce a laser beam propagating in the opposite direction with respect to the laser beam delivered by the said lens-pair. An example of such an auxiliary optical system includes, but is not limited to, an optical system consisting of mirrors, combination of lens(es) and mirrors as well as phase conjugate mirrors.

Further the invention makes page-based optical recording schemes compatible with one of the bit-based recording schemes.

All such variations are considered to be within the scope and spirit of the present invention as defined by the following claims and their legal equivalents.

What is claimed:

1. A lens system for data recording and retrieval, comprising:
   a. a first lens combination, wherein said first lens combination comprises a first lens element and a second lens element;
   b. a second lens combination, wherein said a second lens combination comprises a third lens element and a fourth lens element;
   c. a light source, wherein said light source comprises a laser beam, wherein said laser beam is divided into a reference beam and an object beam, wherein said reference beam is directed to a data recording location;
   d. a spatial light modulator, wherein said object beam is directed to said spatial light modulator, wherein said spatial light modulator operates on said object beam to form a digital data object beam, wherein said digital data object beam is directed through said first lens combination to form a Fourier transformed digital data object beam, wherein said Fourier transformed digital data object beam interferes with said reference beam at said data recording location, wherein said Fourier transformed digital data object beam forms a recordable Fourier volume at said data recording location; and e. a two-dimensional detector array, wherein said recordable Fourier volume at said data recording location is illuminated by said reference beam to form a reconstruction beam, wherein said reconstruction beam is directed through said second lens combination to form an inversely Fourier transformed digital data object beam; wherein said inversely Fourier transformed digital data object beam is directed to said a two-dimensional detector array to create 2D page data output, wherein each said lens of said first lens combination and said second lens combination is an air spaced aspheric doublet having at least 5-degrees of freedom, wherein said degrees of freedom are selected from the group consisting of a radii of said lens surface, a thickness of said lens, an air spacing between two said lenses, an index of refraction of said lens, and at least one conic aspheric constant of said lens.

2. The lens system of claim 1, wherein each said lens of said first lens combination and said second lens combination has a numerical aperture in a range of 0.3 to 0.86.

3. The lens system of claim 1, wherein said second lens element and said third lens are disposed proximal to said data recording location, wherein said second lens element comprises a meniscus lens element having a positive-power surface and a negative-power surface, wherein said negative-power surface is disposed to face said medium, wherein said first lens and said fourth lens are disposed distal to said recording medium, wherein said first lens and said fourth lens elements comprise a positive lens element having a first surface and a second surface, wherein said second surface is selected from the group consisting of a negative-power surface, a planar surface and a weak positive power surface, wherein said first surface comprises a positive-power surface, wherein said second surface is disposed proximal to said data recording location.

4. The lens system of claim 1, wherein said lens system satisfies an offense against sine condition, wherein said offence against sine condition is a value less than $(0.1 \times \text{pixel size})/(\sqrt{2}\, NA)$.

5. The lens system of claim 1, wherein a geometrical spot diameter in root mean square ($D_{rms}$) formed by said light source passing through said lens system satisfies a condition $D_{rms} \approx 0.001$ mm, wherein said light source is selected from the group consisting of said object beam, said reference beam and a reconstruction reference beam.

6. The lens system of claim 1, wherein said lens system has a wavefront aberration in root mean square (rms) of an object imaging configuration ($\sigma_{image}$) in rms of $\sigma_{image} < 0.025/f$, wherein f is a focal length of said lens pair for a scaled system, wherein said scaled system is scaled by a factor of f.

7. The lens system of claim 1, wherein said lens system has a wavefront aberration of a pupil imaging configuration ($\sigma_{pupil}$) in rms of $\sigma_{pupil} < 0.05/f$, wherein f is a focal length of said lens pair for a scaled system, wherein said scaled system is scaled by a factor off.

8. The lens system of claim 1, wherein said optical recording medium is selected from the group consisting of CD, CD-R, CR-RW, CD+RW, DVD-RAM, DVD-ROM, DVD-R, DVD+R, DVD-RW, DVD+RW, BluRay and BD-R.

* * * * *